(12) United States Patent
Ueda et al.

(10) Patent No.: US 8,447,370 B2
(45) Date of Patent: *May 21, 2013

(54) MICROPHONE TECHNIQUES

(75) Inventors: Joji Ueda, Cambridge, MA (US); David Kleinschmidt, Natick, MA (US)

(73) Assignee: Bose Corporation, Framingham, MA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/079,156

(22) Filed: Apr. 4, 2011

(65) Prior Publication Data
US 2011/0230239 A1 Sep. 22, 2011

Related U.S. Application Data

(63) Continuation of application No. 11/619,992, filed on Jan. 4, 2007, now Pat. No. 7,920,903.

(51) Int. Cl.
*H04M 1/00* (2006.01)
(52) U.S. Cl.
USPC .................................. 455/575.1; 455/575.2
(58) Field of Classification Search
USPC ...... 455/41.1–41.3, 66.1, 569.1, 575.1–575.2
See application file for complete search history.

(56) References Cited

U.S. PATENT DOCUMENTS

| | | | |
|---|---|---|---|
| 7,072,476 B2* | 7/2006 | White et al. | 381/74 |
| 7,110,800 B2* | 9/2006 | Nagayasu et al. | 455/575.2 |
| 7,215,766 B2* | 5/2007 | Wurtz | 379/430 |
| 7,720,232 B2* | 5/2010 | Oxford | 381/66 |
| 7,920,903 B2* | 4/2011 | Ueda et al. | 455/575.1 |
| 2003/0228019 A1* | 12/2003 | Eichler et al. | 381/71.8 |
| 2007/0184881 A1* | 8/2007 | Wahl et al. | 455/575.2 |
| 2008/0274764 A1* | 11/2008 | Masuda et al. | 455/550.1 |

FOREIGN PATENT DOCUMENTS

| | | |
|---|---|---|
| JP | 05277995 A | 10/1993 |
| JP | 06014307 A | 1/1994 |
| JP | 06121455 A | 4/1994 |
| JP | 08051686 A | 2/1996 |
| JP | 9036784 A | 2/1997 |
| JP | 09037380 A | 2/1997 |
| JP | 2005286712 A | 10/2005 |
| JP | 2005318061 A | 11/2005 |
| JP | 2008507926 A | 3/2008 |
| WO | 2006028587 A2 | 3/2006 |

OTHER PUBLICATIONS

Chinese Office Action dated Feb. 27, 2012 for Application No. 200680027687.1.
Japanese Decision of Rejection dated Apr. 17, 2012 for JP Application No. 2009-503197.
Japanese Decision of Rejection dated May 15, 2012 for JP Application No. 2010-177445.
Chinese Office Action Dated Jun. 5, 2012 for Application No. 200680027687.1.

* cited by examiner

*Primary Examiner* — Simon Nguyen
(74) *Attorney, Agent, or Firm* — Bose Corporation

(57) ABSTRACT

Among other features, a boom microphone has a microphone connector; an earcup module includes an earcup connector jack to connect to a headphone and a boom lead-in to receive the microphone connector; and a control module communicates voice signals wirelessly between (a) the boom microphone and headphone and (b) a telephone.

10 Claims, 7 Drawing Sheets

100 US 8,447,370 B2

MICROPHONE TECHNIQUES

CROSS-REFERENCE TO RELATED APPLICATION

This present application is a continuation of application Ser. No. 11/619,992 filed Jan. 4, 2007 by Joji Ueda and David Kleinschmidt, now U.S. Pat. No. 7,920,903, the disclosure of which is incorporated herein by reference.

BACKGROUND

This description relates to microphone techniques.

SUMMARY

In general, in an aspect, a boom microphone has a microphone connector; an earcup module includes an earcup connector jack to connect to a headphone and a boom lead-in to receive the microphone connector; and a control module communicates voice signals wirelessly between (a) the boom microphone and headphone and (b) a telephone.

Implementations may include one or more of the following features. The microphone connector is non-axisymmetric. There is a power connection to carry power from a power source in the headphone through the earcup connector jack to the powered circuitry. The control module is adapted to equalize the voice signals from the boom microphone. The control module is adapted to determine if the boom microphone is attached to the earcup module. The control module includes a connector adapted to carry a signal from an audio player to the headphone. The control module is adapted to automatically mute the signal from an audio player when an incoming call is received by the cell phone. The control module further includes a wireless module for managing communication with the cell phone. The wireless module includes a Bluetooth module.

In general, in an aspect, a headphone includes a power source, a microphone is attachable to the headphone, control circuitry not in the headphone controls use of audio signals associated with the microphone and the headphone, and there is a power connection between the power source of the headphone and the control circuitry.

Implementations may include one or more of the following features. The headphone includes noise canceling circuitry. The control circuitry controls audio signals used for telephone calls that are passed wirelessly to and from a telephone set. The power connection includes conductors of a cable. The power source includes a battery. The microphone includes a boom microphone. There is a connector between the microphone and the headphone.

In general, in an aspect, signals are received from a microphone, the signals being representative of a voice of a user wearing an active noise reducing headphone. The received electrical signals are processed to produce derived signals representative of the voice. The derived signals are delivered to a transducer in the headphone to be played to the user. The signal processing causes the derived signals to be natural reproductions of the user's voice as played to the user.

Implementations may include one or more of the following features. The microphone is attachable to the headphone. The signal processing includes equalization. The signal processing includes level setting. The signal processing is based on configuration information provided by the user.

In general, in an aspect, microphone signals are received that are representative of a voice of a user wearing a headphone, and the received signals are equalized in accordance with an inverse of a transfer function of sound traveling a path from the user's mouth via the headphone to an ear of the user multiplied by a transfer function of sound traveling a path from the user's mouth to the user's ear, absent the headphone.

In general, in an aspect, a shielded noise canceling microphone is attachable to and detachable from a noise canceling headphone.

Implementations may include one or more of the following features. There is a connector between the microphone and the headphone. The microphone includes a boom microphone.

In general, in an aspect, a microphone is connectable to a noise canceling headphone, and a controller separate from the microphone is connectable to the noise canceling headphone and to the microphone. The controller includes a wireless transceiver to communicate microphone and headphone signals to and from a telephone set.

In general, in an aspect, a microphone is attachable to and detachable from the headphone and adapted to draw current from a power source in the headphone. Circuitry determines the connection state of the microphone to the headphone based on detecting the drawing of current.

Implementations may include one or more of the following features. The microphone includes a noise canceling microphone. The power source includes a battery. The circuitry includes a unit that is separate from the headphone and the microphone. The circuitry disconnects a telephone call when it determines that the microphone has been disconnected.

In general, in an aspect, a microphone is attachable to and detachable from the headphone, and circuitry communicates microphone and headphone signals to and from a telephone set and disconnects a telephone call in progress at the telephone set if the microphone is detached during the call.

Implementations may include one or more of the following features. The circuitry includes wireless communication circuitry to communicate the signals. The circuitry includes a unit that is separate from the microphone and the headphone.

In general, in an aspect, a connector attaches a microphone to and detaches the microphone from a headphone non-axisymmetrically, and the connector is configured to cause the microphone to have the same orientation relative to the mouth after the microphone is attached to the headphone as the orientation that existed when the microphone was previously attached to the headphone.

Implementations may include one or more of the following features. An orientation of the microphone relative to the mouth of a person wearing the headphone can be adjusted using a gooseneck. The microphone comprises a boom microphone. The connector and the microphone connect non-axi-symmetrically.

In general, in an aspect, a connector attaches a microphone to and detaches the microphone from a headphone, the connector having a non-axisymmetric cross-section.

In general, in an aspect, circuitry has ports for connection to a telephone set to carry telephone audio signals, to a music source to carry music audio signals, to a headphone to play audio signals, and to a microphone to convert speech to audio signals, the circuitry being configured to detect an incoming phone call while music audio signals from the source are being played in the headphone and to switch audio signals played by the headphone from the music audio signals to the telephone audio signals.

Implementations may include one or more of the following features. The circuitry is separate from the headphone, the telephone set, the music source, the headphone, and the microphone. The connection to the telephone set is wireless.

In general, an aspect includes detecting when a microphone associated with a headphone is no longer providing voice signals for one side of a telephone call, and in response to the detecting, terminating the telephone call.

Implementations may include one or more of the following features. The detecting includes electronically determining when the microphone has been detached from the headphone. Terminating the call includes sending a hang up indication from a controller associated with the headphone. The hang up indication is sent wirelessly to a telephone set.

These and other features and aspects and combinations of them may be expressed as apparatus, methods, systems, means for performing a function, program products, and in other ways.

Other advantages and features will become apparent from the following description and from the claims.

DESCRIPTION

Figure 1:
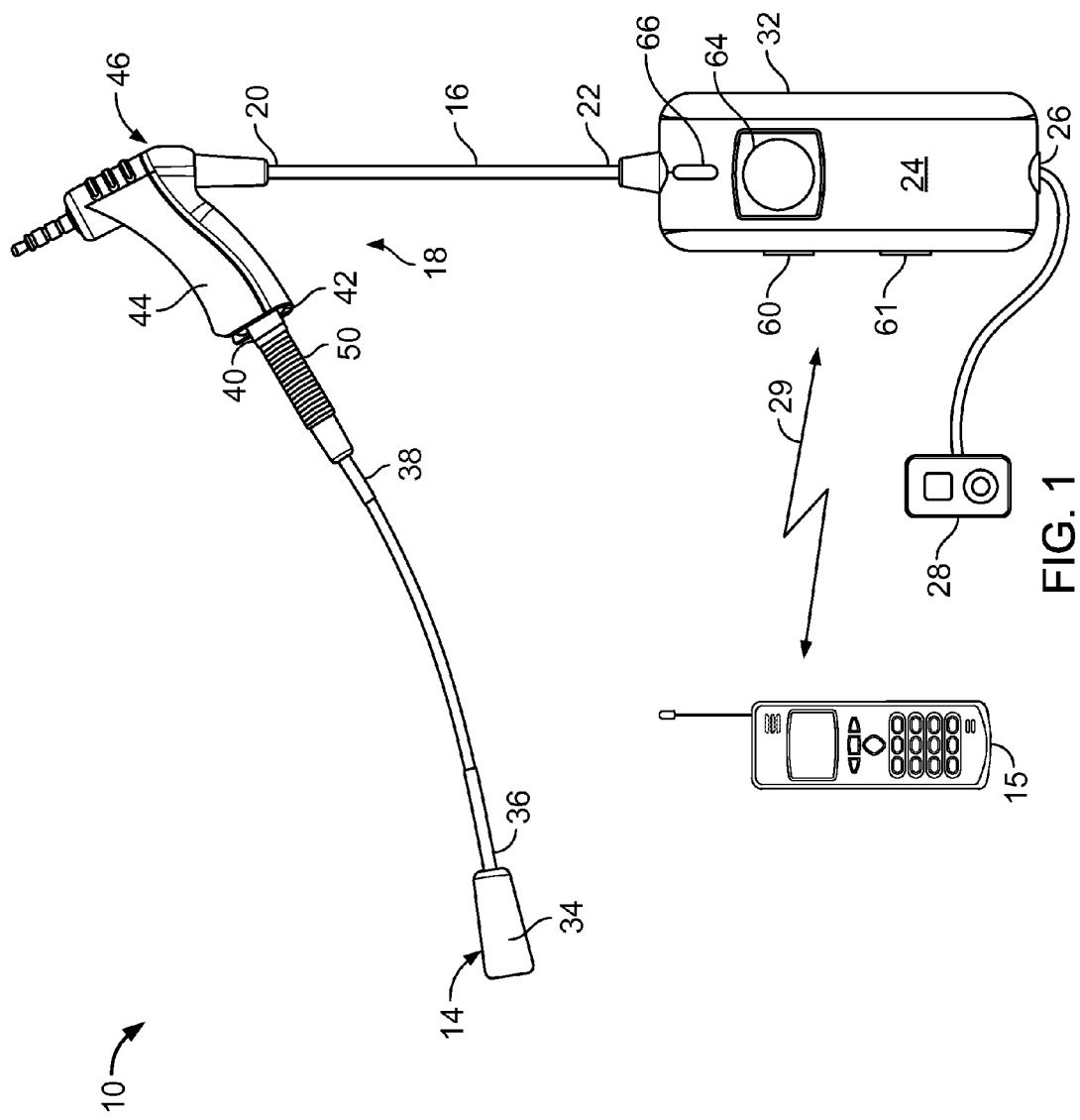
FIG. 1 is a front view of a microphone accessory.
Figure 6:
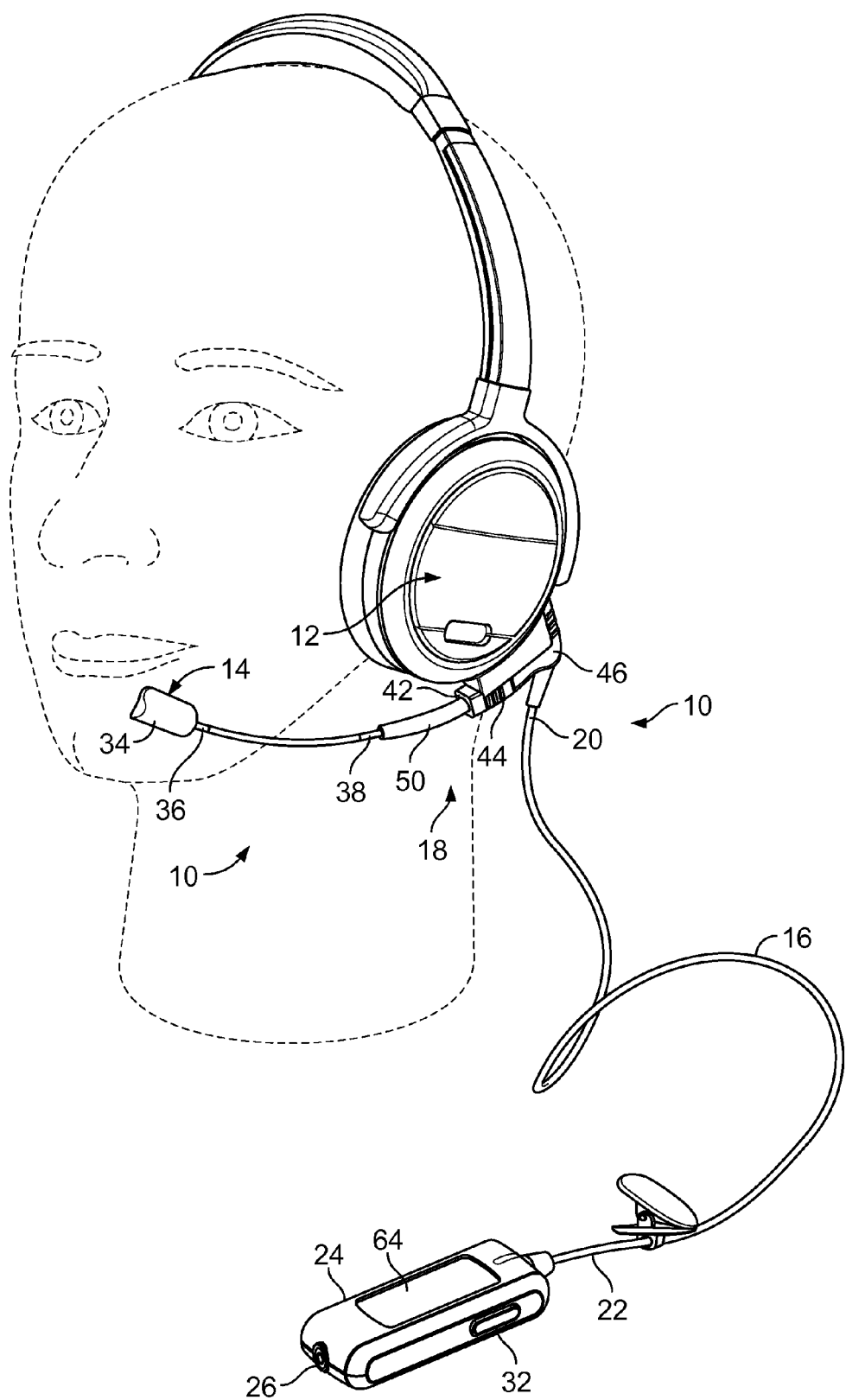
FIG. 6 is a perspective view of a dummy wearing headphones.
Figure 7:
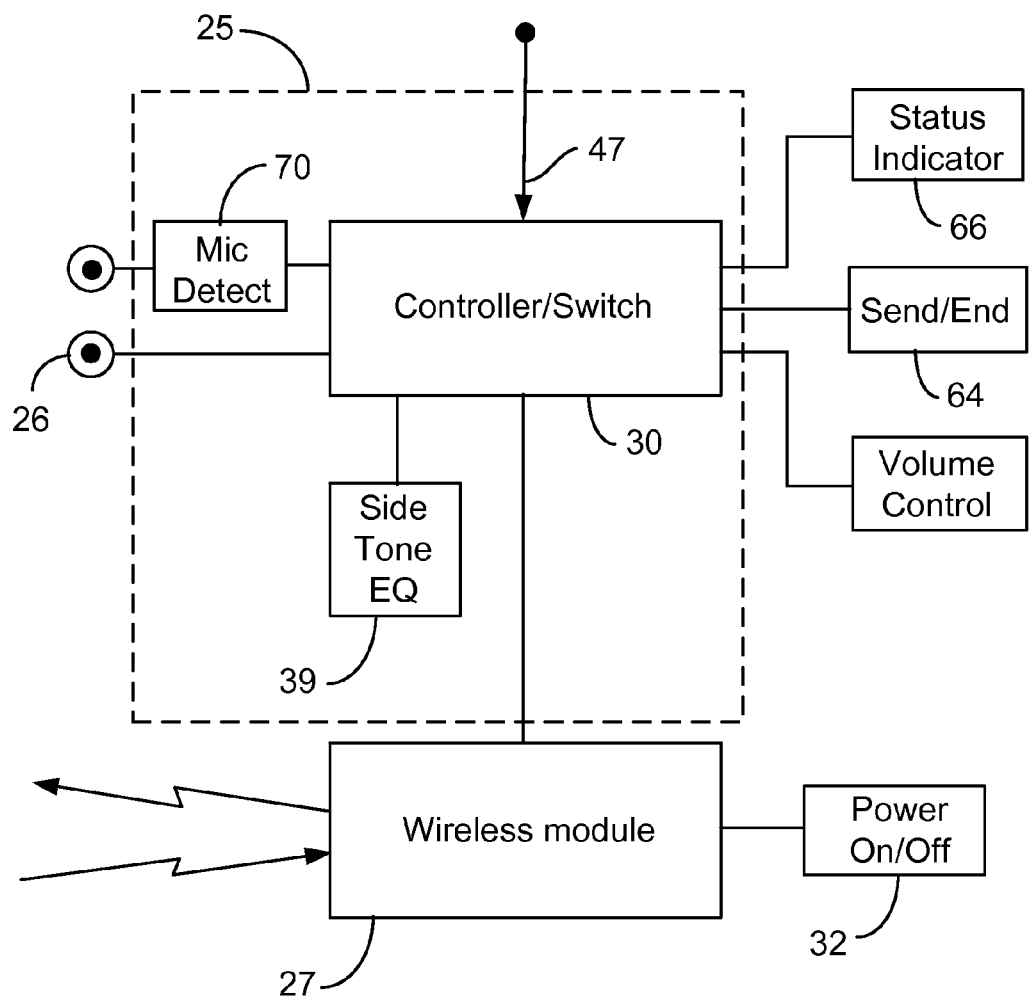
FIG. 7 is a block diagram of control module circuitry.

As shown in FIGS. 1 and 6, a microphone accessory 10 for a set of headphones 12, such as Bose Quiet Comfort 3 headphones or any other kind of active noise canceling or non-noise canceling headphone or headphones (including surrounding the ear, on the ear, or in the ear), provides Bluetooth (or other) wireless connectivity of the headphones 12 and a microphone 14 to a Bluetooth (or other)-enabled cell phone 15 (not shown to scale). (We sometimes use the plural headphones to refer also to a single headphone.) The cable (not shown) that is normally supplied with the headphones is replaced by a cable 16 having a detachable microphone boom assembly 18 at one end 20 and, at the other end 22, a control module 24 that houses circuitry 25 (FIG. 7) to control the use of the microphone, the headphones, and the wireless connectivity with the cell phone, among other things; a Bluetooth transceiver module 27 (FIG. 7), and an input jack 26 to receive a stereo music (or other) audio signal from a music (or other audio) source 28 (not shown to scale) such as an MP3 player, a CD player, or a radio.

The accessory 10 provides hands-free operation and use of the Bluetooth-enabled cell phone and carries audio signals between the cell phone and the headphones, even in environments that were previously considered too noisy to carry on a telephone conversation.

Circuitry in the control module includes automatic audio source switching 30 (FIG. 7) that enables the user to recognize and accept a cell phone call without taking off the headphones. When the microphone is in use, during a phone call, for example, a side tone is provided that allows the user to hear himself talk in a natural voice even in high ambient noise environments which yields a more natural speaking experience while wearing the headphones.

The accessory is powered by the headphone's battery (not shown) through one or more power conductors 47 that are, for example, part of cable 16, thereby eliminating the need to carry another battery charger for the accessory. The accessory 10 is normally powered on whenever the headphones are turned on, provided the accessory is plugged into the headphones. A Bluetooth on/off switch 32 on the control module controls the power supplied to the Bluetooth module. The Bluetooth module can be turned off during an airline flight, for example, while still allowing stereo music to be routed from the music source through the control module to the headphones. The accessory can be stored in the headphones carrying case while attached to the headphones. The microphone 14, which in some examples is a boom microphone, can be stored in a boom holder in the headphones carrying case.

The microphone 14 is a commercial noise canceling microphone available from vendors such as Knowles Acoustics of Itasca, Ill. The length of cable 16 (which is not shown to scale in FIG. 1) is, in some examples, about 20 cm. A plastic housing 34 supporting the microphone may allow stray electrical signals to interfere with the electrical signal representing the sound received by the microphone. The microphone may be electrically shielded by inserting a grounded conductor (not shown) between the plastic housing and microphone. The grounded conductor may be disposed on the plastic housing or on the microphone and may be grounded by the ground lead from the microphone.

Figure 2:
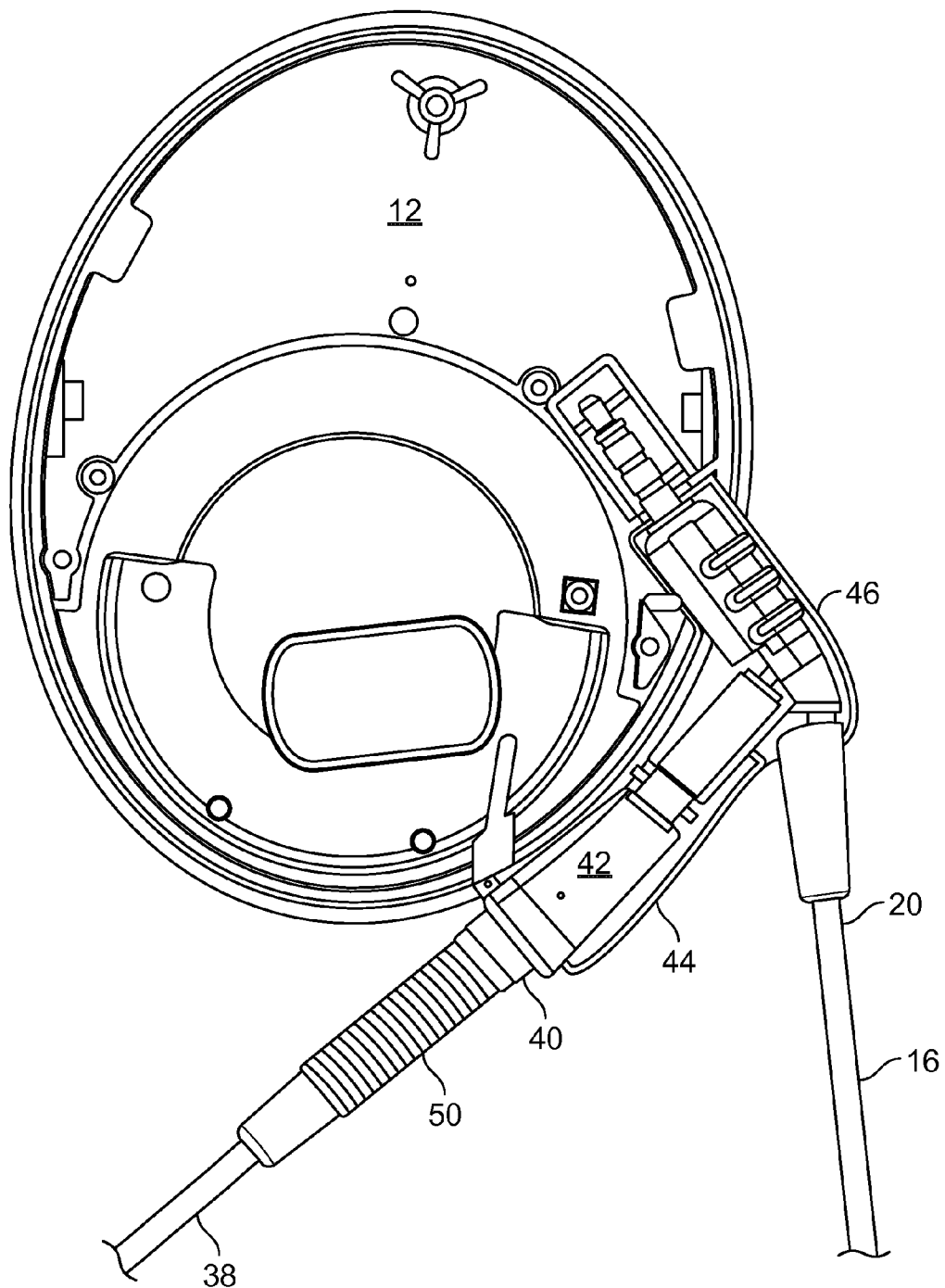
FIG. 2 is a front view, partially broken away of a microphone accessory and headphones.

The microphone 14 (which is hidden in FIG. 1) is held on one end 36 of a microphone boom 38. The other end 40 of the boom is coupled to a microphone connector 42 (which we also sometimes call a boom connector). The microphone connector 42 is seated within a lead-in receptacle 44 of an earcup module 46. For attaching and removing the boom microphone to and from the earcup module 46, the connector 42 can be guided into a lead-in receptacle 44 (FIG. 2) of the earcup module 46. The boom microphone connector is contoured (as shown in FIG. 3) to match a contoured internal wall of the earcup module lead-in to preserve the orientation and position of the microphone relative to the user's mouth when the boom microphone is detached from and reattached to the earcup module.

Figure 3:
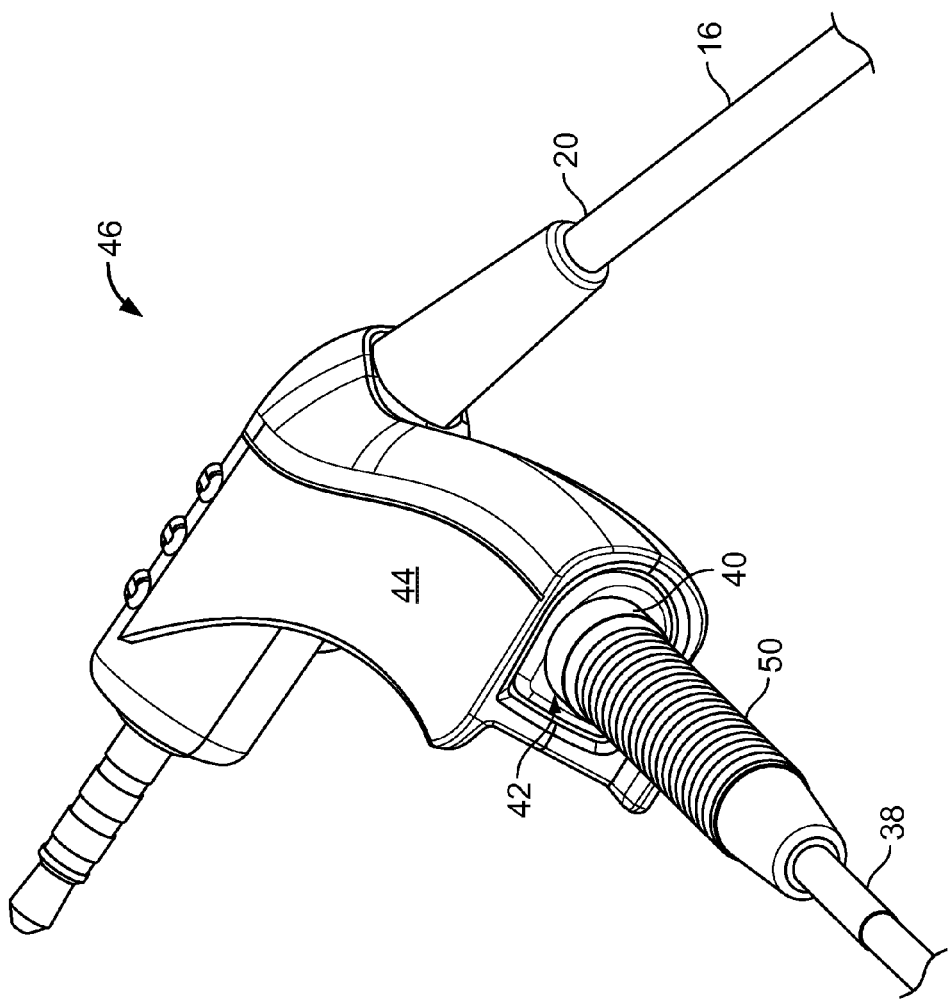
FIGS. 3 and 4 are perspective views of an earcup module.
Figure 4:
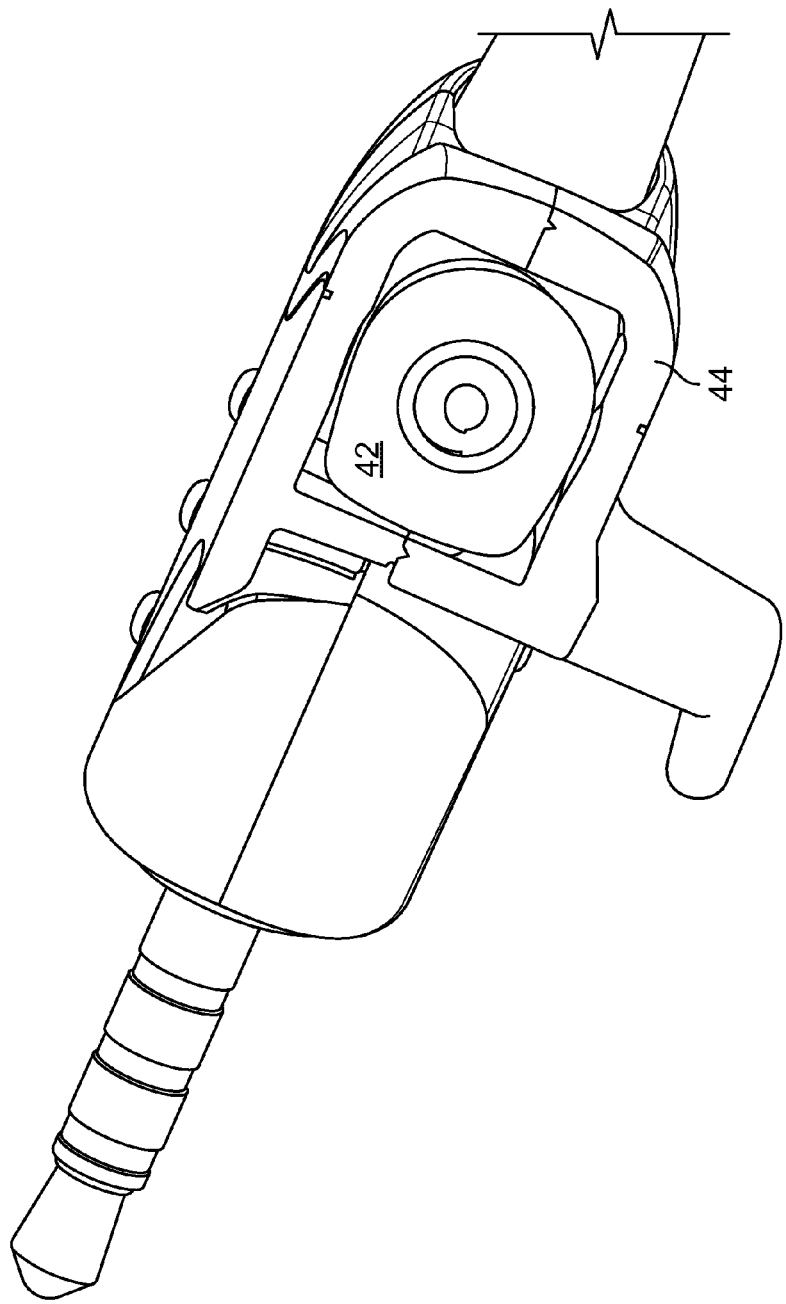

The cross-sectional contour of the microphone connector and the lead-in are non-axisymmetric around an axis that lies along the length of the microphone boom to allow the connector to fit into the boom lead-in in only one orientation, as shown in FIG. 3. The proper orientation could also be enforced by a slot-key configuration in which the key fits in the slot to prevent rotation of the key beyond the confines of the slot. The slot may be located on the boom connector or the lead-in.

A gooseneck 50 between the boom 38 and the boom connector allows the user to adjust the position and orientation of the noise canceling microphone relative to his mouth and maintains the position and orientation when the user inserts or removes the detachable boom microphone from the earcup module. The keyed microphone connector allows the user to remove the boom microphone after he has adjusted the microphone and later reattach the boom microphone with the microphone having the same, or close to the same position and orientation upon reattachment.

Figure 5:
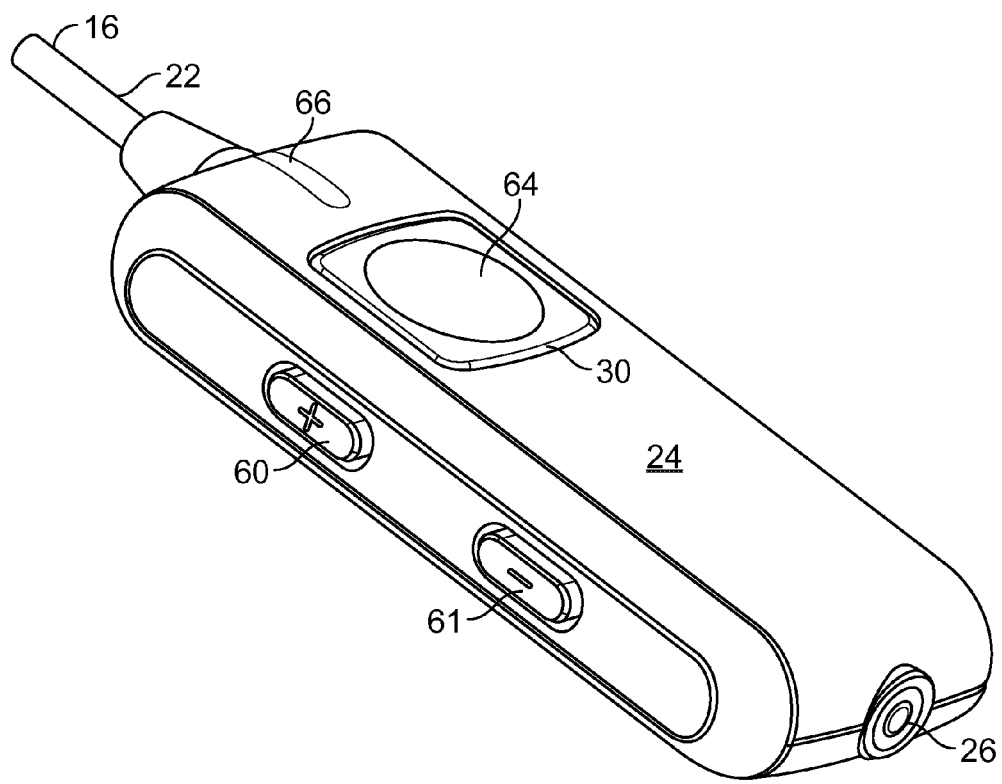
FIG. 5 is a perspective view of a control module.

The on/off switch 32 that controls power to the Bluetooth module in the control module is on the opposite side of the module from the up and down volume controls 60, 61 shown in FIG. 5. The volume controls and send/end control 64 perform different functions depending on the operating mode of the module. The mode is indicated by an indicator light 66.

One operating mode is a pairing mode in which the accessory is paired with a Bluetooth-enabled cell phone. The user enters the pairing mode by pressing the send/end button on the control module and the VOL+ button simultaneously while the control module is powered on. When in the pairing mode, the indicator light is constantly lighted. Once in pairing mode, the user enters a predetermined code into his cell phone. For example, the user enters 0000 as the pairing code.

Once the pairing has occurred, the Bluetooth link 29 between the control module and the cell phone carries audio and control signals back and forth between the cell phone and the control module. After the cell phone has been paired to the accessory, the control module enters a stand-by mode, indicated by a blink once every 3 seconds. In stand-by mode, short-pressing the send/end button activates a voice dialing mode in the cell phone, if it has such a feature, to allow the user to dial a number using voice commands through the microphone. (Otherwise the user can dial using the cell phone keypad, for example.) A short-press is a press that lasts, for example, less than 2 seconds. A long-press is one that lasts more than 2 seconds. Long-pressing the send/end button causes the last number dialed to be redialed. If the cell phone has voice dialing capability and the user enters voice dialing mode, the user can cancel voice dialing by a short-press on the send/end button. The user can also end the last number redial mode by a short-press on the send/end button.

When the control module is in stand-by mode and an incoming call is received, the appearance of the incoming call is reported by the cell phone to the control module, and the control module enters a ringing mode. If, when the incoming call appears, the user is listening to a music player connected through the music player jack, the control module alerts the user of the incoming call and allows the user to answer the incoming phone call. The control module can alert the user of the incoming call by altering the music so that the call is audible by, for example, automatically muting or pausing the music player, by lowering the level of the music, or by playing the music player in one ear while playing the call in the other ear. The user may answer the incoming call by a short-press on the send/end control or by pressing the VOL+ control. The user may reject the incoming call by a long-press on the send/end control or by pressing the VOL− control. When the user rejects or ends a call, the audio program automatically is unmuted or resumed by the control module.

When the user is talking on the phone, the control module is in an active call mode indicated by a 2-second-on/5-second-off cycle by the indicator light. In the active call mode, the user can end the call by a short-press on the send/end control or can transfer the call by a long-press on the send/end control. During a call, the user can increase or decrease the volume by pressing the VOL+ or VOL− control, respectively.

During the call, the user's voice is played back through the headphones as a side-tone. When wearing typical headphones, especially noise canceling headphones, the transfer function between the user's mouth and his ears is altered so that the user can hear only a modified version of his voice that sounds un-natural to him. In some implementations described here, the user's voice is played back through the headphones as a side-tone so that the user hears his voice naturally as if he were not wearing the headphones. Before being played into the headphones, the side-tone may be equalized or level adjusted or both (by signal processing circuitry 39, FIG. 7, in the control module) to make the side-tone sound close to the user's natural voice so that the user does not perceive an unwanted difference compared to what he is accustomed to hearing when not wearing the headphones.

The equalization and level adjustments will depend on both the microphone and headphones. In generally, the equalizer can have a response that is the inverse of the complete transfer function (in the frequency domain) from mouth to ear (through the electronic system including the headset), multiplied by the measured response (approximate across a large number of users) from mouth to ear through the air.

For a specific microphone and headphones combination, a variety of equalization and level settings may be tried with different users and the setting preferred by a majority of the different users may be selected. The preferred setting may be implemented as a non-adjustable equalization/level side-tone module within the control module or as a default setting in an adjustable equalization/level side-tone module within the control module. For example, a non-adjustable equalization/level side-tone module may be implemented using a fixed gain and boosting of an upper portion of a human voice range to produce a more naturally sounding side-tone. If a different microphone is used with the headphones, the side-tone module may increase or decrease the high frequency boost to compensate for the different microphone.

The side-tone can mimic the level, variability, frequency, or other characteristics of the attenuation imposed by the headset. Among other things, low frequency response can be adjusted to compensate for the bass boost that characterizes typical noise canceling microphones when they are located close to the speaker's mouth and for equalization that has been configured for music reproduction.

Providing a side-tone equalized as described can also be useful in circumstances other than during a phone call, including having a normal live conversation with another person. The user may end a call by pressing the send/end button or by detaching the boom microphone from the earcup module. The control module monitors the signal from the boom microphone and when the signal drops below a predetermined threshold, the control module assumes that the boom microphone has been detached. The control module may also detect (by microphone detection circuitry 70, FIG. 7, in the control module) the detachment of the boom microphone by monitoring a current draw (or a voltage change across a bias resistor) that powers the microphone. When the control module detects boom microphone detachment, the control module hangs up the call by sending a hang up indication to the cell phone and places the Bluetooth module into the standby mode. Conversely, when the microphone is attached and an incoming call is received, the control module may automatically answer the call and allow the user to start talking.

In some embodiments, the user may simply detach the microphone during a teleconference to just listen to the teleconference. This "listen only" feature may also be implemented by a separate switch or control on the control module. This feature may be useful when the user is in a noisy environment and needs only to listen to the teleconference.

Other implementations are also within the scope of the claims.

For example, some embodiments include placing some or all of the control module circuitry in the earcup module and providing controls on the earcup module, boom microphone, or on a remote control. Some embodiments include placing the control module circuitry within the earcup of the headphones.

The circuitry used to implement the features described above is straightforward. The Bluetooth module, for example, is a standard Bluetooth module that can be purchased by various vendors such as, for example, Samsung Micro Electronics Corporation. Although Bluetooth protocol is used as the wireless protocol, other short-range wireless protocols may be used.

Additional information about electronic interfacing with a head-mounted device, and headset audio accessories is set forth in U.S. patent application Ser. Nos. 11/191,873, filed Jul. 28, 2005, and 11/390,718, filed Mar. 27, 2006, which are incorporated here by reference in their entireties.

What is claimed is:

1. A headphone comprising:
a microphone disposed on the headphone in a manner placing the microphone towards a mouth of a user wearing the headphone to detect a voice of the user and output a signal representative of the voice;
a transducer disposed on the headphone in a manner placing the transducer towards an ear of the user to acoustically output a derived signal representative of the voice; and
a signal processing circuitry carried by the headphone employing at least a partial inverse of the transfer function of the user's voice propagating from the user's mouth to the ear of the user that results from the user wearing the headphone to produce the derived signal from the signal output by the microphone, wherein the derived signal is a more natural reproduction of the user's voice as played to the ear of the user by the transducer.

2. The headphone of claim 1, wherein the signal processing circuitry implements equalization in producing the derived signal.

3. The headphone of claim 1, wherein the signal processing circuitry implements level setting in producing the derived signal.

4. The headphone of claim 1, wherein the signal processing circuitry boosts an upper portion of a human voice range of frequencies in producing the derived signal.

5. The headphone of claim 1, wherein the signal processing circuitry adjusts low frequency response in producing the derived signal to compensate for bass boost where the microphone is a noise canceling microphone.

6. The headphone of claim 1, wherein the signal processing circuitry receives and employs configuration information provided by the user to adjust the manner in which the signal processing circuitry employs at least a partial inverse of the transfer function.

7. The headphone of claim 1, further comprising an earcup module, wherein the earcup module is shaped to be positioned in one of a set of possible positions relative to the ear of the user, the set consisting of surrounding the ear, on the ear and in the ear.

8. The headphone of claim 1, wherein:
the microphone detects another voice of a person other than the user;
the microphone outputs an additional signal representative of the other voice of the person other than the user;
the transducer acoustically outputs an additional derived signal representative of the other voice;
the signal processing circuitry employs the at least a partial inverse of the transfer function to produce the additional derived signal from the additional signal output by the microphone.

9. The headphone of claim 1, further comprising a boom to position the microphone in proximity to the mouth of the user.

10. The headphone of claim 9, wherein the microphone boom is detachable from the headphone.

* * * * *